United States Patent

Wieand et al.

[11] Patent Number: 6,055,441
[45] Date of Patent: Apr. 25, 2000

[54] SYSTEMS AND METHODS FOR FACSIMILE COMMUNICATION OVER A CELLULAR RADIOTELEPHONE COMMUNICATIONS LINK

[75] Inventors: Bruce R. Wieand, Cary; Jerry A. Gilkey, Raleigh; Alan F. Swanstrom, Cary, all of N.C.

[73] Assignee: International Business Machines Corporation, Armonk, N.Y.

[21] Appl. No.: 08/641,193

[22] Filed: Apr. 30, 1996

[51] Int. Cl.[7] .................................. H04Q 7/32; H04Q 7/20
[52] U.S. Cl. ........................ 455/557; 455/550; 455/556; 455/414; 455/412
[58] Field of Search ..................................... 455/550, 557, 455/556, 414, 412, 445, 344; 395/200.5; 358/426, 350, 401, 404, 435, 437, 443, 444, 452, 453, 462, 468, 469, 487; 379/100.01, 100.03, 100.05, 100.15, 100.17

[56] References Cited

U.S. PATENT DOCUMENTS

| | | |
|---|---|---|
| 3,726,993 | 4/1973 | Lavallee .................................. 358/426 |
| 4,837,800 | 6/1989 | Freeburg et al. ....................... 455/557 |
| 5,463,477 | 10/1995 | Kakizaki ................................. 455/557 |
| 5,621,894 | 4/1997 | Menezes et al. ................... 395/200.57 |
| 5,752,199 | 5/1998 | Scott ....................................... 455/557 |

*Primary Examiner*—Fan S. Tsang
*Assistant Examiner*—Keith Ferguson
*Attorney, Agent, or Firm*—Myers Bigel Sibley & Sajovec; Jerry W. Herndon

[57] ABSTRACT

Facsimile data representing facsimile images is communicated between a facsimile application resident on a remote computer and at least one facsimile station operatively connected to a server computer. Facsimile data communicated from the facsimile application and from a cellular radiotelephone communications link connecting the remote computer to the server computer is stored in the remote computer. Facsimile data is communicated between the remote computer and the server computer over the cellular radiotelephone communications link according to a cellular radiotelephone data communications protocol. Facsimile data communicated to the server computer from the remote computer and from the facsimile station is stored in the server computer. An identifier of previously communicated facsimile data may be communicated between the remote computer to the server computer, preferably a cache entry identifier corresponding to facsimile data cached in the remote computer and the server computer. Facsimile data from the facsimile application may be compressed before communication radiotelephone communications link, and facsimile data communicated over the cellular radiotelephone communications link may be decompressed before communication to the facsimile application. According to a "Register to Send" aspect, a facsimile identifier is communicated from the server computer to pre-allocate a facsimile identifier to the remote computer which the remote computer can use to monitor the status of a facsimile transmission.

27 Claims, 7 Drawing Sheets

SYSTEMS AND METHODS FOR FACSIMILE COMMUNICATION OVER A CELLULAR RADIOTELEPHONE COMMUNICATIONS LINK

FIELD OF THE INVENTION

The present invention relates to communications systems and methods, in particular, to facsimile communications systems and methods.

BACKGROUND OF THE INVENTION

Facsimile systems are widely used to transmit images, typically of documents, from one location to another. Conventionally, a document is scanned by a "fax machine" to convert it into facsimile data which is then transmitted over a communications channel, typically a voice channel on the Public Switched Telephone Network (PSTN). The document is then reconstructed into hard copy from the transmitted facsimile data by a similar facsimile machine located at the other end of the communications channel.

Standard communications protocols have been developed for transmission of facsimile data. Older analog protocols, such as CCITT Group 1 and Group 2, are now obsolete. The digital CCITT Group 3 protocol, widely used by conventional office and home facsimile machines, uses digital modems transmitting digital facsimile data at speeds up to 9600 baud over conventional PSTN telephone lines. The Group 3 protocol includes handshaking and signal quality evaluation features which enable facsimile machines to step down the communication baud rate if the communications channel exhibits poor quality. A CCITT Group 4 protocol has also been established to provide less error-prone communication between facsimile machines over public data networks other than the PSTN.

Personal computers (PCs) may also employ hardware and software which emulate the functions of a facsimile machine. A facsimile application program resident in the PC may create and edit "fax files," i.e., data files including facsimile data representing facsimile images communicated to and from other facsimile stations. This facsimile data is communicated to and from a so-called "fax modem" plugged into an expansion slot of the PC. The fax modem is connected to the PSTN in a manner similar to a standard facsimile machine, and sends and receives signals over the PSTN according to a standard facsimile data transfer protocol, conventionally the Group 3 protocol.

Because of the increased mobility it offers, cellular radiotelephone technology is increasingly supplanting the PSTN for many communications applications. Mobile cellular radiotelephones are now a common sight in businesses, home, and automotive environments. Personal computers have also been adapted for use with cellular radiotelephone communications systems, exchanging the wireline modem for a similar device acting over a cellular radiotelephone voice or data channel.

A major obstacle to implementation of facsimile communications over cellular radiotelephone communications systems is the generally lower bandwidth, lower signal quality, and higher communications costs associated with cellular radiotelephone channels in comparison to conventional PSTN channels. For example, due to the cellular nature of cellular radiotelephone communications systems, communications between subscribers in the system may be abruptly interrupted as subscribers move between cells in the system. While such interruptions are normally tolerable in voice applications, they generally are unacceptable for facsimile communication, causing the loss of significant amount of data and corruption of the facsimile image being transmitted. Similarly, cochannel interference which may be tolerable in a voice application may cause unacceptable corruption of facsimile data transmitted over a cellular radiotelephone channel.

The Group 3 protocol used by conventional facsimile machines and personal computer fax modems is generally ill-suited for cellular radiotelephone communications because the Group 3 protocol is designed for the relatively reliable, relatively high-bandwidth and relatively low-cost PSTN. As described above, the Group 3 protocol is generally limited to stepping down the baud rate of the communications between facsimile machines when the communications channel between the machines is poor. Such a response can be ineffective in dealing with service interruptions and high levels of co-channel interference, however. In addition, communicating facsimile data over a cellular radiotelephone voice channel according to the Group 3 protocol can be economically inefficient, as time on a cellular radiotelephone channel tends to be relatively expensive in comparison to time on a conventional PSTN voice channel. Although Group 3 includes some data compression to remove redundant data in a particular facsimile image, a significant amount of redundant data may be still be transmitted over the communications channel. For example, if the same document is to be transmitted to multiple facsimile stations, the entire document, including repetitive elements such as cover page form elements, typically must be sent across a cellular radiotelephone link to each recipient.

A system for providing more reliable radio transmission of facsimile data using packet data protocols with checking and retransmission features is described in U.S. Pat. No. 5,282,238 to Berland. Although such a system can cut down on transmission errors, it may not fully optimize communication of facsimile data over the radio link. For example, a significant amount of redundant information may still be communicated over the radio link, such as cover page form elements or multiple transmissions of the same image. When combined with the retransmission of data which may occur because of the use of a more robust data transmission protocol, such a system may prove to be prohibitively costly for some facsimile users. Moreover, such a system is designed to interface with a standard facsimile machine or a fax modem which produces data according to a standard facsimile protocol such as the Group 3 protocol, and thus may not realize data transfer efficiencies which may be gained from directly interfacing to a facsimile application program resident on a remote computer.

SUMMARY OF THE INVENTION

In light of the foregoing, it is an object of the present invention to provide systems and methods for communicating facsimile images between a facsimile application program resident on a remote computer and at least one other facsimile station via a cellular radiotelephone communications link.

It is another object of the present invention to provide systems and methods for communicating facsimile data over a cellular radiotelephone communications link which reduce redundant information transfer over the cellular radiotelephone communications link to thereby reduce the cost of communicating facsimile images between the facsimile application and the other facsimile stations.

These and other objects, features and advantage are provided by systems and methods for communicating facsimile images from a facsimile application resident on a remote computer to at least one other facsimile station, such as a standard facsimile machine, by communicating facsimile data between the remote computer and a server computer over a cellular radiotelephone communications link according to a cellular radiotelephone data communications protocol, wherein the server computer is operatively connected to the other facsimile station. Buffering of communications between the facsimile application and the server computer is provided by storing facsimile data in the remote computer and the server computer. An identifier representing facsimile data already communicated between the remote computer and the server computer may be communicated instead of redundantly communicating data which has already been communicated, with the identifier preferably including a cache entry identifier corresponding to facsimile data cached in the remote computer and the server computer. Facsimile data communicated from the facsimile application may also be compressed.

According to a "Register to Send" aspect, a facsimile identifier may be communicated from the server computer to the facsimile application to pre-allocate the identifier to the application. Facsimile data, including the previously communicated facsimile identifier, may then be communicated from the remote computer to the server computer, thereby associating the facsimile identifier with a set of facsimile data. The status of the facsimile data associated with the facsimile data may then be queried by the remote computer using the pre-allocated facsimile identifier, even if an acknowledgement is not received after transmission of facsimile data from the server computer due to a dropout or other momentary failure of the cellular radiotelephone communications link.

The present invention thus provides efficient and effective ways to communicate facsimile images to and from a facsimile application resident on a remote computer such as a laptop, notebook or other computer operating through a cellular radiotelephone modem. Data buffering on the remote computer and the server computer provides for communication of facsimile data according to a cellular radiotelephone data communications protocol which is less error prone than standard facsimile protocols such as the Group 3 protocol, without requiring modification of the facsimile application. The client/server architecture provides for more reliable and efficient use of the cellular radiotelephone communications link because features such as user profiles and activity logs can help reduce the redundant transmission of facsimile data. Transmission of facsimile data identifiers, such as cache entry identifiers, can provide ever greater efficiency.

In particular, according to the present invention, a method of communicating facsimile images from a facsimile application resident on a remote computer to at least one facsimile station, such as a facsimile application resident on a second remote computer, a facsimile application resident on the server computer, or a standard facsimile machine, includes storing facsimile data produced by the facsimile application in the remote computer. The stored facsimile data is communicated from the remote computer to a server computer over a cellular radiotelephone communications link according to a cellular radiotelephone data communications protocol and stored in the server computer. The facsimile data stored in the server computer is communicated to the at least one facsimile station.

The step of communicating stored facsimile data from the remote computer to the server computer may include the step of communicating an identifier of facsimile data previously communicated between the remote computer and the server computer. The step of communicating stored facsimile data from the remote computer to the server computer may be preceded by caching facsimile data previously communicated between the facsimile application and the server computer in the remote computer and in the server computer, which includes the step of associating a cache entry identifier with the cached facsimile data. The step of communicating an identifier of facsimile data may include identifying a cache entry identifier such that the associated facsimile data cached in the remote computer corresponds to the facsimile data produced by the facsimile application, and communicating the identified data cache entry identifier from the remote computer to the server computer. The step of storing the communicated facsimile data may include storing facsimile data cached in the server computer corresponding to the cache entry identifier communicated from the remote computer. The step of communicating facsimile data stored in the remote computer may be preceded by compressing facsimile data produced by the facsimile application to thereby reduce redundant communication of facsimile data over the radiotelephone communications link.

In a reverse data flow from the above-described method, a method of communicating facsimile images from at least one facsimile station to a facsimile application resident on a remote computer includes communicating facsimile data representing a facsimile image from the facsimile station to a server computer. The facsimile data communicated from the facsimile station is stored in the server computer. The stored facsimile data is communicated from the server computer to the remote computer over the cellular radiotelephone communications link according to a cellular radiotelephone data communications protocol. The facsimile data communicated from the server computer is stored in the remote computer. The facsimile data stored in the remote computer is then communicated to the facsimile application.

The step of communicating stored facsimile data from the server computer to the remote computer may include communicating an identifier of facsimile data previously communicated between the remote computer and the server computer. The step of communicating stored facsimile data from the server computer to the remote computer may be preceded by caching facsimile data previously communicated between the server computer and the facsimile application in the remote computer and the server computer, which includes the step of associating a cache entry identifier with the cached facsimile data. The step of communicating an identifier of facsimile data may include identifying a cache entry identifier such that the associated facsimile data cached in the server computer corresponds to facsimile data communicated from the facsimile station, and communicating the identified data cache entry identifier from the server computer to the remote computer. The step of storing the communicated facsimile data may then include storing facsimile data cached in the remote computer corresponding to the cache entry identifier communicated from the server computer. The step of communicating the facsimile data stored in the server computer may be preceded by compressing facsimile data communicated from the facsimile station to thereby prevent redundant communication of facsimile data over the radiotelephone communications link, with the step of communicating facsimile data stored in the remote computer to the facsimile application preceded by the step of decompressing facsimile data communicated from the server computer.

According to a "Register to Send" method aspect, the step of communicating facsimile data from the server computer to the remote computer may be preceded by communicating a facsimile identifier from the server computer to the facsimile application. The step of communicating facsimile data stored in the server computer may include the step of communicating facsimile data including the previously communicated facsimile identifier to thereby associate the facsimile identifier with a set of facsimile data communicated from the remote computer to the server computer. The method may further include the steps of communicating a facsimile status query from the facsimile application to the server computer, the facsimile status query comprising a query as to the status of the set of facsimile data associated with the facsimile identifier, and communicating a facsimile communication status from the server computer to the facsimile application, in response to the communicated facsimile status query. In this manner, the status of a facsimile transmission may be queried by the remote computer. For example, the facsimile communication status may be used to determined which facsimile data in the set should be retransmitted.

A remote computer for communicating facsimile images to a facsimile station operatively connected to a server computer according to the present invention includes a facsimile application resident on the remote computer. Cellular radiotelephone data communicating means communicates facsimile data between the remote computer and the server computer over a cellular radiotelephone communications link according to a cellular radiotelephone data communications protocol. Client facsimile data storage means, responsive to the facsimile application and to the cellular radiotelephone communicating means, stores facsimile data on the remote computer.

The cellular radiotelephone data communicating means may include means for communicating an identifier of facsimile data previously communicated between the remote computer and the server computer. Preferably, the means for communicating an identifier of facsimile data includes remote computer data caching means for caching facsimile data communicated between the remote computer and the server computer in the remote computer, including means for associating a cache entry identifier with the cached facsimile data. The means for communicating an identifier of facsimile data may further include means, responsive to the facsimile application, for identifying a cache entry identifier such that the associated facsimile data cached in the remote computer corresponds to facsimile data produced by the facsimile application, and means, responsive to the means for identifying a cache entry identifier, for communicating the identified cache entry identifier from the remote computer to the server computer over the radiotelephone communications link.

The means for communicating an identifier of facsimile data may also include means for communicating a cache entry identifier from the server computer to the remote computer over the radiotelephone communications link, and means, responsive to the means for communicating the cache entry identifier, for identifying facsimile data cached in the remote computer corresponding to the communicated cache entry identifier. The client facsimile data storage means may include means, responsive to the means for identifying facsimile data cached in the server computer, for storing the facsimile data corresponding to the communicated cache entry identifier in the remote computer. The cellular radiotelephone data communicating means may also include client facsimile data compressing means for compressing facsimile data produced by the facsimile application and client facsimile decompressing means for decompressing facsimile data communicated from the server computer.

According to a "Register to Send" aspect, the remote computer may further include means for communicating a facsimile identifier from the server computer to the facsimile application. The cellular radiotelephone communicating means may include means for communicating facsimile data including the previously communicated facsimile identifier, to thereby associate the previously communicated facsimile identifier with a set of facsimile data communicated from the remote computer to the server computer. The remote computer may also include means for communicating a facsimile status query from the facsimile application to the server computer, the facsimile status query comprising a query as to the status of the set of facsimile data associated with the facsimile identifier, and means, responsive to the means for communicating a facsimile status query, for communicating a facsimile communication status from the server computer to the facsimile application.

A server computer for communicating facsimile images between a facsimile application resident on a remote computer and at least one facsimile station according to the present invention includes cellular radiotelephone data communicating means for communicating facsimile data between the remote computer and the server computer over a cellular radiotelephone communications link according to a cellular radiotelephone data communications protocol. Facsimile data communicating means communicates facsimile data between the server computer and the at least one facsimile station. Server facsimile data storage means, responsive to the facsimile station and to the cellular radiotelephone data communicating means, stores facsimile data on the server computer.

The cellular radiotelephone data communicating means may include means for communicating an identifier of facsimile data previously communicated between the remote computer and the server computer. Preferably, the means for communicating an identifier of facsimile data comprises server computer data caching means for caching facsimile data communicated between the facsimile application and the server computer in the server computer, the server computer data caching means including means for associating a cache entry identifier with the cached facsimile data. The means for communicating an identifier of facsimile data may further include means for communicating a cache entry identifier from the remote computer to the server computer over the radiotelephone communications link and means, responsive to the means for communicating the cache entry identifier, for identifying facsimile data cached in the server computer corresponding to the communicated cache entry identifier. The server facsimile data storage means may include means, responsive to the means for identifying facsimile data cached in the server computer, for storing the identified cached facsimile data in the server computer.

The means for communicating an identifier of facsimile data may also include means, responsive to the server facsimile data storage means, for identifying a cache entry identifier such that the associated facsimile data cached in the server computer corresponds to facsimile data to be communicated to the remote computer, and means for communicating the identified cache entry identifier from the server computer to the remote computer over the radiotelephone communications link.

According to a "Register to Send" aspect, the server computer may include means for communicating a facsimile identifier from the server computer to the facsimile application. The cellular radiotelephone communicating means may include means for communicating facsimile data including the previously communicated facsimile identifier to thereby associate the previously communicated facsimile identifier with a set of facsimile data communicated from the remote computer to the server computer. The server computer may further include means for communicating a facsimile status query from the remote computer to the server computer, the facsimile status query comprising a query as to the status of the set of facsimile data associated with the facsimile identifier, and means, responsive to the means for communicating a facsimile status query, for communicating a facsimile communication status from the server computer to the remote computer, in response to a communicated facsimile status query.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Figure 1:
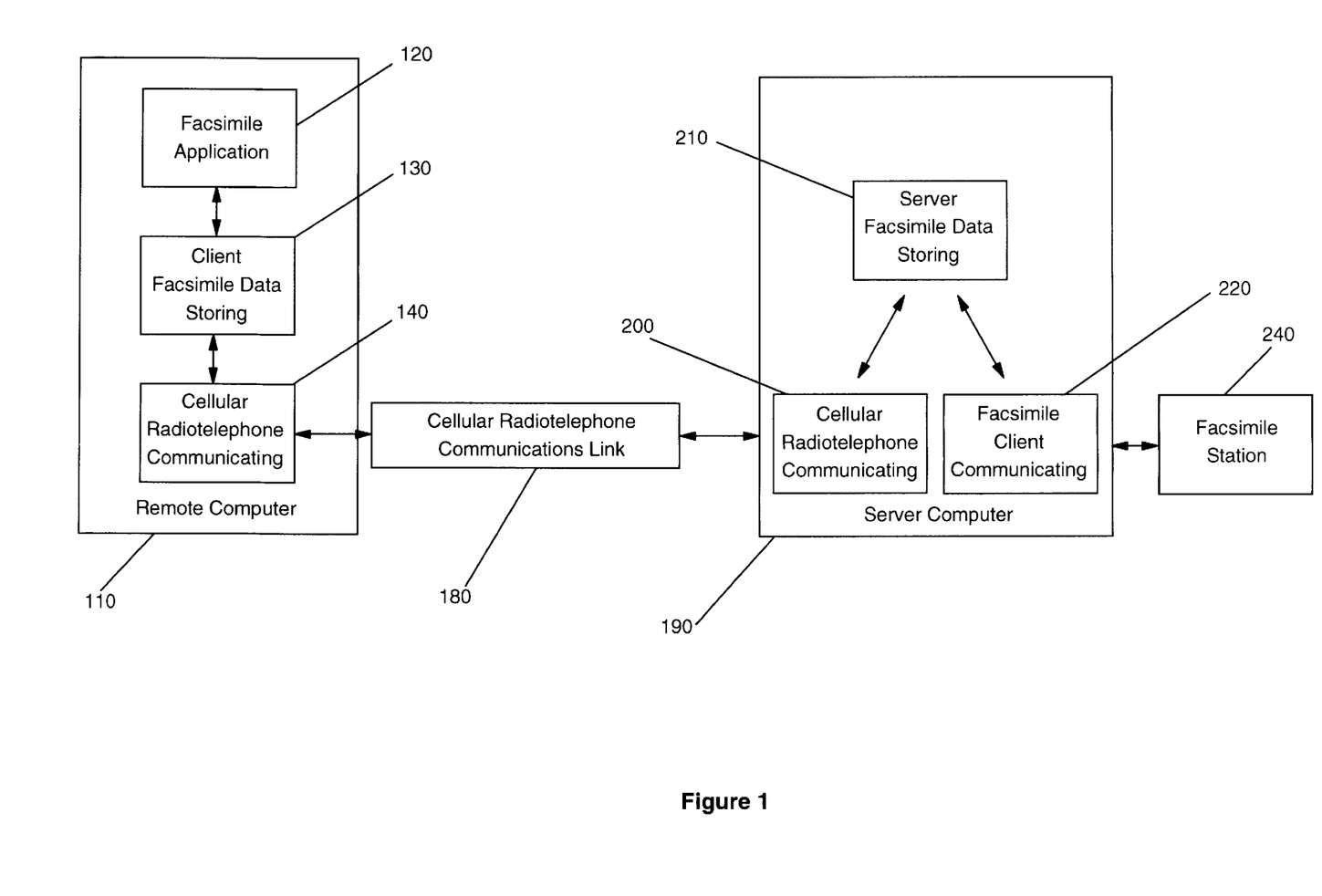
FIG. 1 illustrates a facsimile communications system according to the present invention.

FIG. 1 illustrates a remote computer 110 for communicating facsimile images with a facsimile station 240 via a cellular radiotelephone communications link 180 and a server computer 190, according to the present invention. The remote computer 110 includes a facsimile application 120 resident on the remote computer 110, client facsimile data storing means 130 for storing facsimile data in the remote computer 110, and cellular radiotelephone communicating means 140 for communicating facsimile data between the remote computer 110 and the server computer 190 over the cellular radiotelephone communications link 180 according to a cellular radiotelephone data communications protocol. The server computer 190 includes cellular radiotelephone communicating means 200 for communicating facsimile data between the server computer 190 and the remote computer 110 over the link 180, server facsimile data storing means 210 for storing facsimile data in the server computer 190, and facsimile client communicating means 220 for communicating facsimile data between the server computer 190 and the facsimile station 240.

The facsimile station 240 may include, for example, a facsimile station, a facsimile application resident on a computer network shared with the server computer 190, or another facsimile application resident on another remote computer connected to the server computer 190 over another cellular radiotelephone communications link similar to the cellular radiotelephone communications link 180. The facsimile client communicating means 220 may include such components as interface driver software, telephone or other modems, the PSTN or other networks, and the like, which connect the server computer 190 to the facsimile station 240 for facsimile data delivery. Those skilled in the art will understand that these components may include analog and digital software, general purpose processors running software, and combinations thereof.

Figure 2:
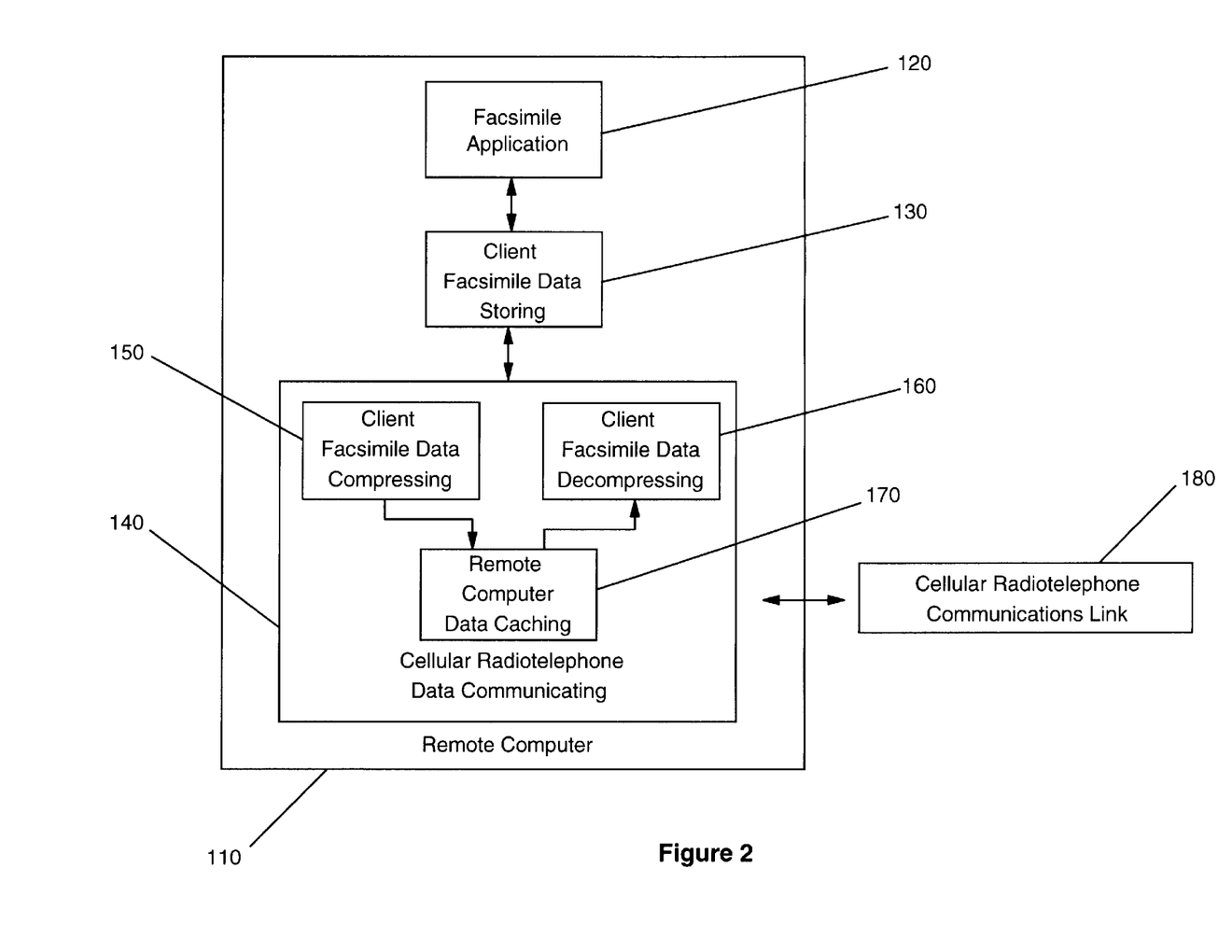
FIG. 2 illustrates a remote computer according to the present invention.

FIG. 2 illustrates elements which may be included in the remote computer 110, including the facsimile application 120, client facsimile data storing means 130 and cellular radiotelephone data communicating means 140, here shown as including remote computer data caching means 170, client facsimile data compressing means 150 and client facsimile data decompressing means 160. The remote computer 110 may include a laptop, notebook or other computer, with the facsimile application 120 being resident on the remote computer 110. Preferably, the facsimile application 120 includes a standard application program for sending and receiving facsimiles on a personal computer. Examples of such standard facsimile applications include the Windows-based WinFax PRO package distributed by the Delrina Technology, Inc., described in the publication "WinFax PRO 3.0 User's Guide" published in 1992 by Delrina Technology, Inc., and the DOS-based ExpressFax software package distributed by the WordPerfect Corporation, as described in "WordPerfect COMMUNICATIONS with EXPRESSFAX, Data Communications and Fax Software for DOS", published Megahertz Corporation, 1993. These software packages, working in conjunction with other software and a fax modem which communicates facsimile data according to a standard facsimile protocol, can provide a computer user with the ability to compose and communicate facsimile images with other facsimile stations, such as standard facsimile machines or other computers operating similar facsimile software programs. Those skilled in the art will understand that other facsimile applications which send and receive facsimile data for communication over a fax modem or similar hardware which uses a standard facsimile protocol may be used with the present invention.

The client facsimile data storing means 130 stores facsimile data communicated from the facsimile application 120 as well as facsimile data communicated to the remote computer 110 via the cellular radiotelephone communications link 180. In this manner, the client facsimile data storing means 130 buffers facsimile data communication between the facsimile application 120 and a server computer 190 such as illustrated in FIG. 1. Those skilled in the art will understand that the facsimile storage data storing means 130 may, for example, include a virtual "mailbox" for storing facsimile data, implemented using hardware such as random access memory (RAM) and magnetic data storage media located in the remote computer 110, controlled by software running on the remote computer 110.

The cellular radiotelephone data communicating means 140 communicates facsimile data between the remote computer 110 and the server computer 190 over the cellular radiotelephone communications link 180 according to a cellular radiotelephone data communications protocol. Those skilled in the art will understand that particular data communications protocols are more suited to particular communications media. For example, packet data protocols that include checking and retransmission features generally are better-suited to communications over a cellular radiotelephone channel because of the frequent service interruption and interference associated with these types of channels. Examples of such protocols include the well-known and popular Internet-type protocols such as the Transfer Control Protocol (TCP) and the User Datagram Protocol (UDP). Those skilled in the art will understand that other protocols having error-compensation features suited to cellular radiotelephone data communications may also be used with the present invention.

The cellular radiotelephone data communicating means 140 may communicate an identifier of facsimile data already communicated between the remote computer 110 and the server computer 190 to more efficiently utilize the radiotelephone communications link 180. For the illustrated embodiment, this may be achieved by remote computer data caching means 170 included in the cellular radiotelephone communicating means 140, which caches facsimile data communicated between the remote computer 110 and the server computer 190, and includes means for associating a cache entry identifier with the cached facsimile data.

According to the present invention, facsimile data caching may operate at different levels, each directed to reducing redundant communication of facsimile data over the cellular radiotelephone communications link 180. For example, repetitive form elements, such as cover page forms, may be cached so that only variable data in the cover page needs to be transmitted across the link 180. Similarly, facsimile data corresponding to the non-overhead information in a message, e.g., images other than cover pages and the like, need only be transferred once and cached to allow the same facsimile to be sent to multiple facsimile stations, thus significantly reducing the volume of facsimile data communicated over the link 180. At another level, communication of redundant facsimile data between the remote computer 110 and the server computer 190 can be further reduced by caching at the raw data level, e.g., by recognizing redundant information communicated in data packets communicated across the cellular radiotelephone communications link 180, and communicating reduced-length packets including identifiers of facsimile data already communicated.

As also illustrated in FIG. 2, the cellular radiotelephone data communicating means may include client facsimile data compressing means 150 and client facsimile data decompressing means 160. The client facsimile data compressing means 150 compresses facsimile data from the facsimile application 120 to help reduce the volume of facsimile data which is communicated over the cellular radiotelephone communications link 180, while client facsimile data decompressing means 160 decompresses data communicated from the server computer 190 before communication to the facsimile application 120. Data compression techniques are well-known and need not be discussed in detail herein. Those skilled in the art will understand that various data compression schemes may be used with the present invention, such as digital image compression techniques which eliminate unnecessary image data.

Figure 3:
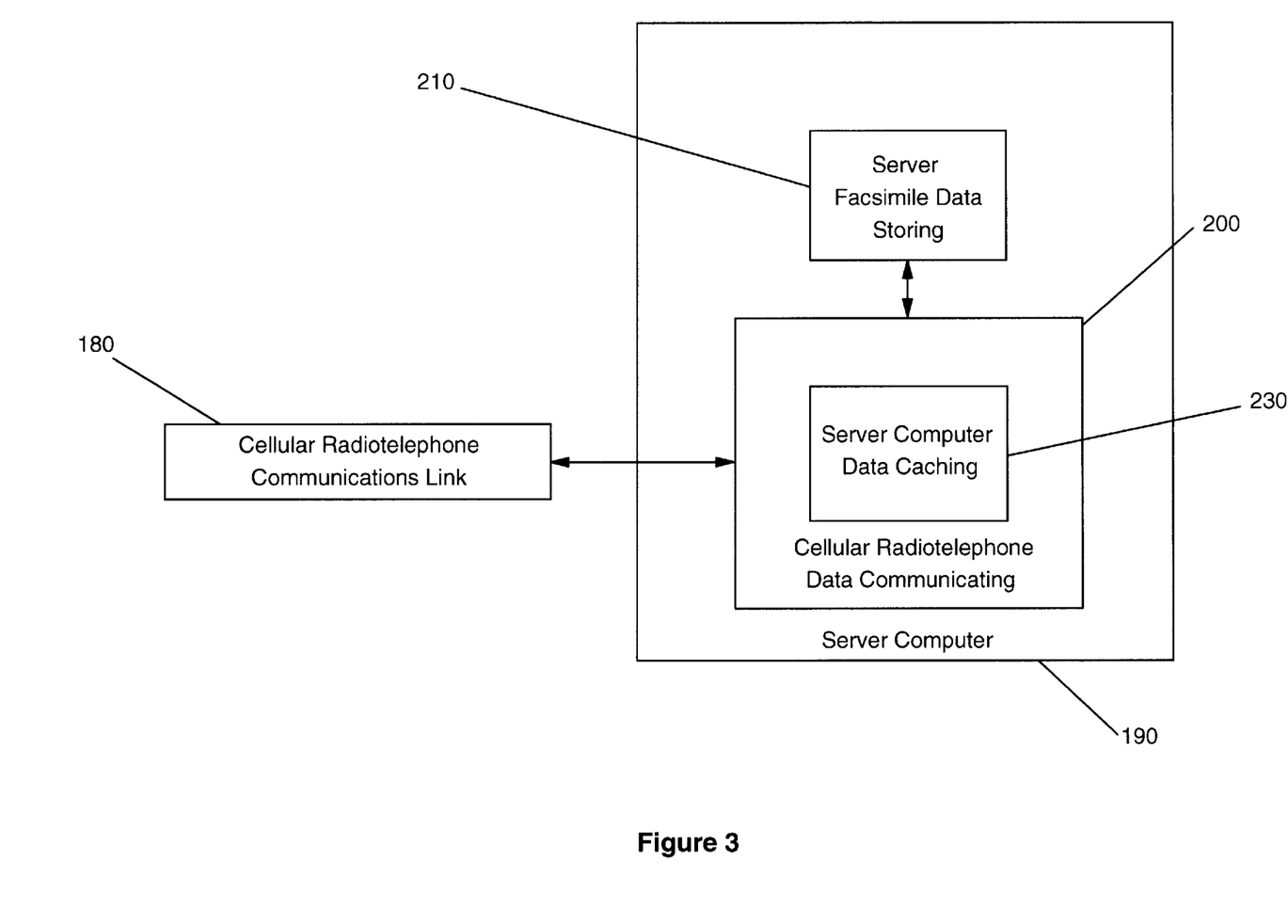
FIG. 3 illustrates a server computer according to the present invention.

FIG. 3 illustrates a server computer 190 according to the present invention, including cellular radiotelephone communicating means 200, here shown including server computer data caching means 230, as well as server facsimile data storage means 210. The cellular radiotelephone communicating means 200 communicates facsimile data between the server computer 190 and a remote computer 110 as described in FIG. 2, according to a cellular radiotelephone data communications protocol. As described above, the cellular radiotelephone protocol includes a protocol suited to cellular radiotelephone data communications, for example, a packet data protocol that includes checking and retransmission features. Examples of such protocols include the well-known and popular Internet-type protocols such as the Transfer Control Protocol (TCP) and the User Datagram Protocol (UDP). Those skilled in the art will understand that other protocols having error-control features which compensate for the service interruption and interference problems associated with cellular radiotelephone data communications may also be used with the present invention.

The cellular radiotelephone data communicating means 200 may communicate an identifier of facsimile data already communicated between the server computer 110 and a remote computer to more efficiently utilize the radiotelephone communications link 180. For the illustrated embodiment, this may be achieved by server computer data caching means 230 included in the cellular radiotelephone communicating means 200, which caches facsimile data communicated between the serve computer 190 and a remote computer. Preferably, the caching functions of the server computer data caching means 230 are complementary to the data caching functions described above in relation to the remote computer data caching means 170 of FIG. 2.

Figure 4:
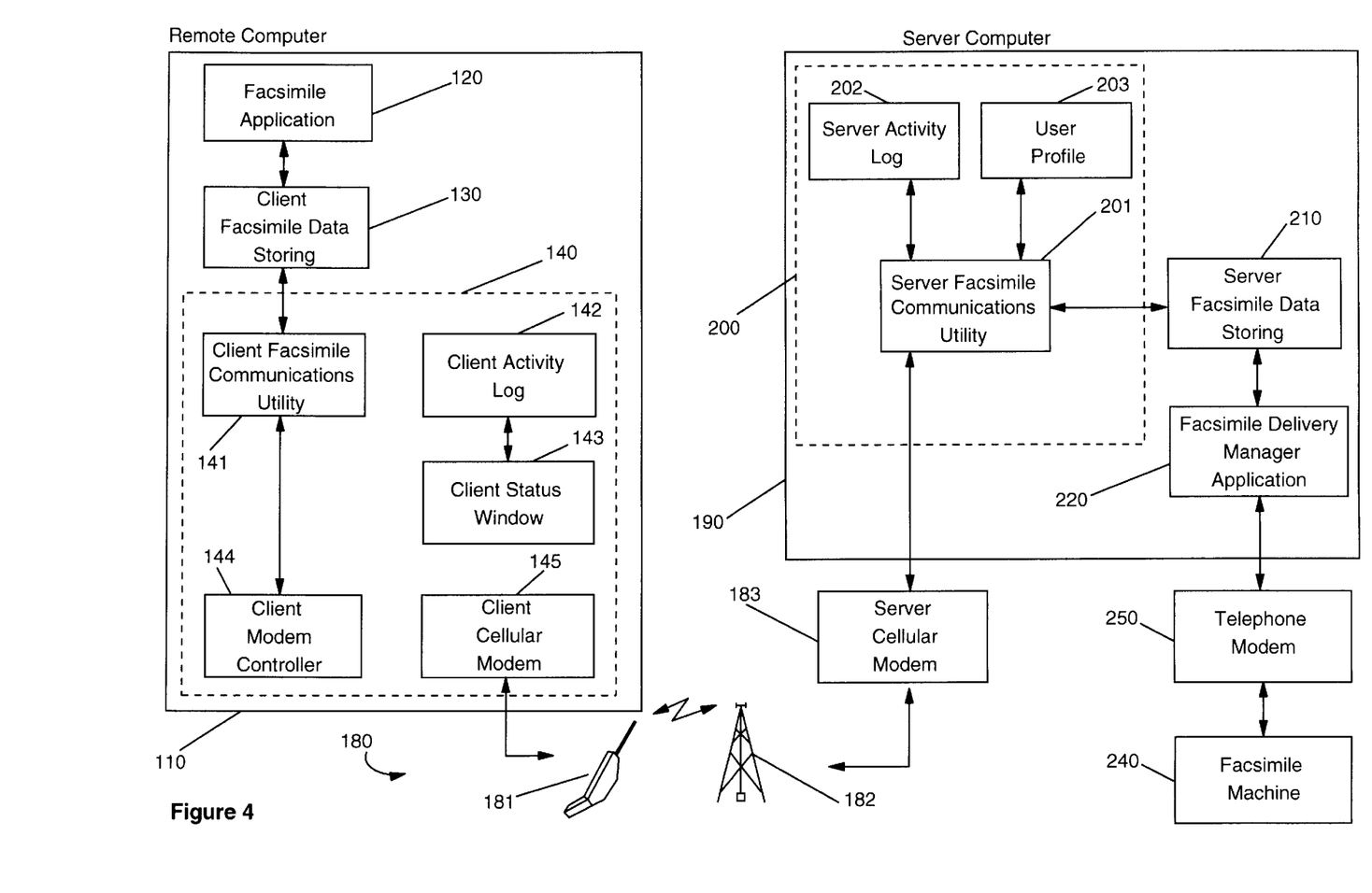
FIG. 4 illustrates an exemplary embodiment of a facsimile communications system according to the present invention.

FIG. 4 illustrates an exemplary embodiment of the present invention. The remote computer 110 includes a facsimile application 120 and client facsimile data storage means 130 as described above. The cellular radiotelephone communicating means 140 in the remote computer 110 is shown including a client facsimile communications utility 141, e.g., a software program linked to a remote computer modem controller 144 and a remote computer cellular modem 145 which communicates facsimile data to and from a cellular radiotelephone 181. The client facsimile communications utility 141 is also shown linked to a client activity log 142 for tracking communication of facsimile data, and a client status window 145 which provides a user of the remote computer 110 with information on the status of facsimile communications to and from the facsimile application 120.

As shown, the cellular radiotelephone communications link 180 includes a cellular radiotelephone 181 which communicates with a cellular radiotelephone base station 182 and a second cellular modem 183. Those skilled in the art will understand that the cellular radiotelephone communications link 180 may include other communications components, such as a Mobile Telephone Switching Office (MTSO) and other portions of a cellular radiotelephone network, as well as portions of the PSTN or other networks. Those skilled in the art will also understand that the cellular radiotelephone communications link 180 may include analog and digital hardware, software running on general purpose processors, and/or combinations thereof.

In addition to the server facsimile data storage means 210 described above, FIG. 4 shows the cellular radiotelephone communicating means 200 of the server computer 190 as including a server facsimile communications utility 201 resident in the server computer 190, interacting with the server facsimile data storage means 210. The cellular radiotelephone communications means 200 is also shown as including a server activity log 202, which tracks facsimile communications, and a user profile 203, which provides the server facsimile communications utility 201 with user information that may be used to control the distribution of facsimile data communicated to and from the facsimile application 120 over the cellular radiotelephone communications link 180. The facsimile client communicating means 220 is illustrated as a facsimile delivery manager application running on the server computer and communicating with a facsimile machine 240 via a telephone modem 250.

Those skilled in the art will understand that the present invention includes variations of the exemplary configuration illustrated in FIG. 4. For example, portions of the cellular radiotelephone communications link 180 and the client facsimile communicating means 220 may be physically integrated or separated from the remote computer 110 and the server computer 190. In some configurations, for example, the remote cellular modem 145 may be positioned external to the remote computer 110. Other communications network components may be interposed between the server cellular modem 183 and the server computer 190, or the cellular modem 183 may be physically positioned within the server computer 190. Although the server computer 190 may be integrated within a single hardware unit such as a microcomputer, minicomputer or mainframe computer, the server computer 190 may also include a plurality of processing and other hardware units which distributively perform all or portions of the functions of the server computer 190.

Figure 5:
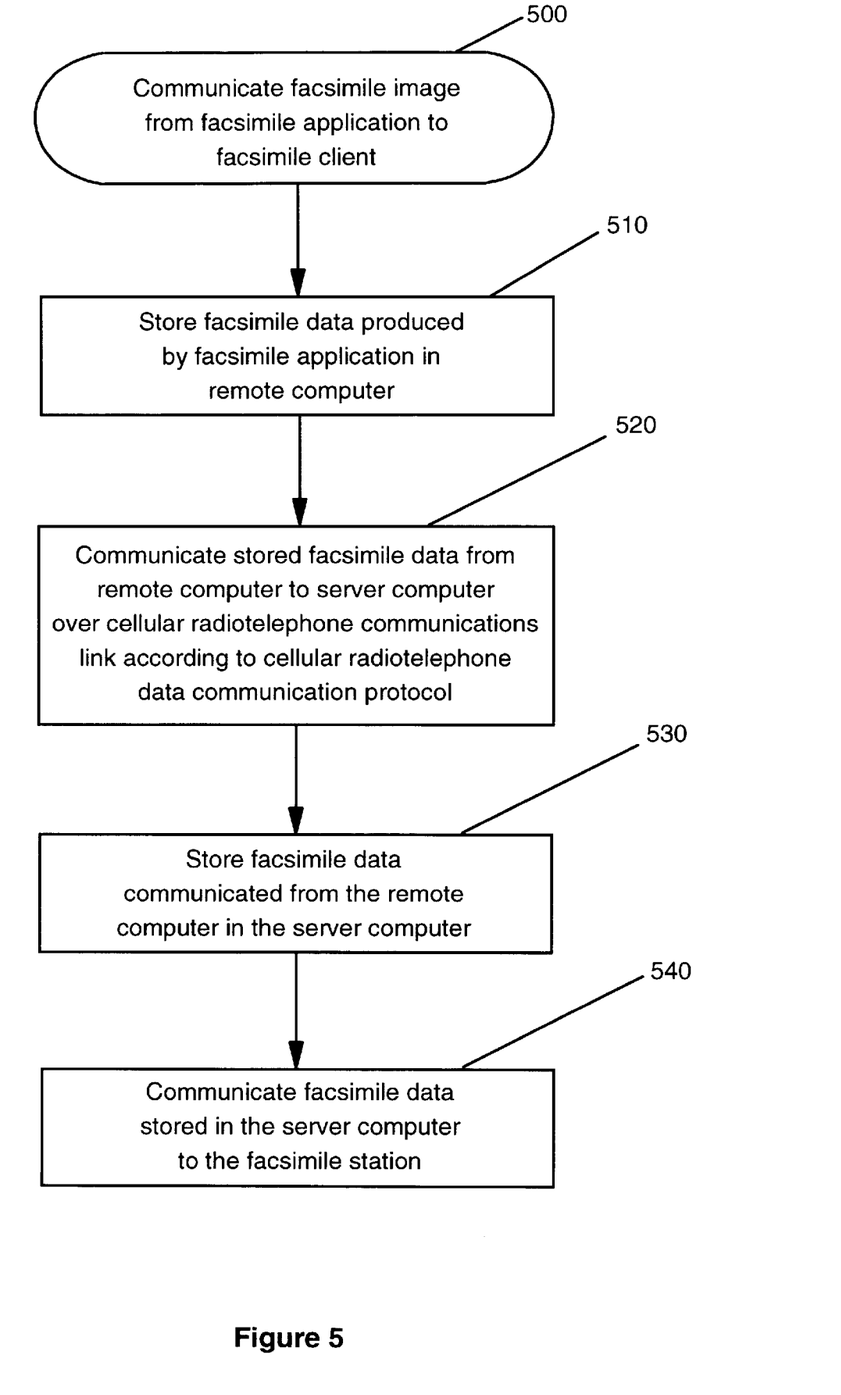
FIG. 5 illustrates operations for communicating a facsimile image from a facsimile application to a facsimile station according to the present invention.

FIG. 5 illustrates operations for communicating a facsimile image from a facsimile application to a facsimile station according to the present invention (Block 500). Facsimile data produced by the facsimile application is stored in the remote computer (Block 510). The stored facsimile data is then communicated from the remote computer to the server computer over the cellular radiotelephone communications link according to a cellular radiotelephone data communications protocol (Block 520). The communicated facsimile data is stored in the server computer (Block 530). The facsimile data stored in the server computer is then communicated to the facsimile station (Block 540). This last step of communication may occur by virtue of various data communications techniques, such as conventional facsimile data communication according to a standard facsimile protocol, facsimile data communication over a data network such as an X.25 packet data network, or facsimile data communication via another cellular radiotelephone communications link to another remote computer.

Figure 6:
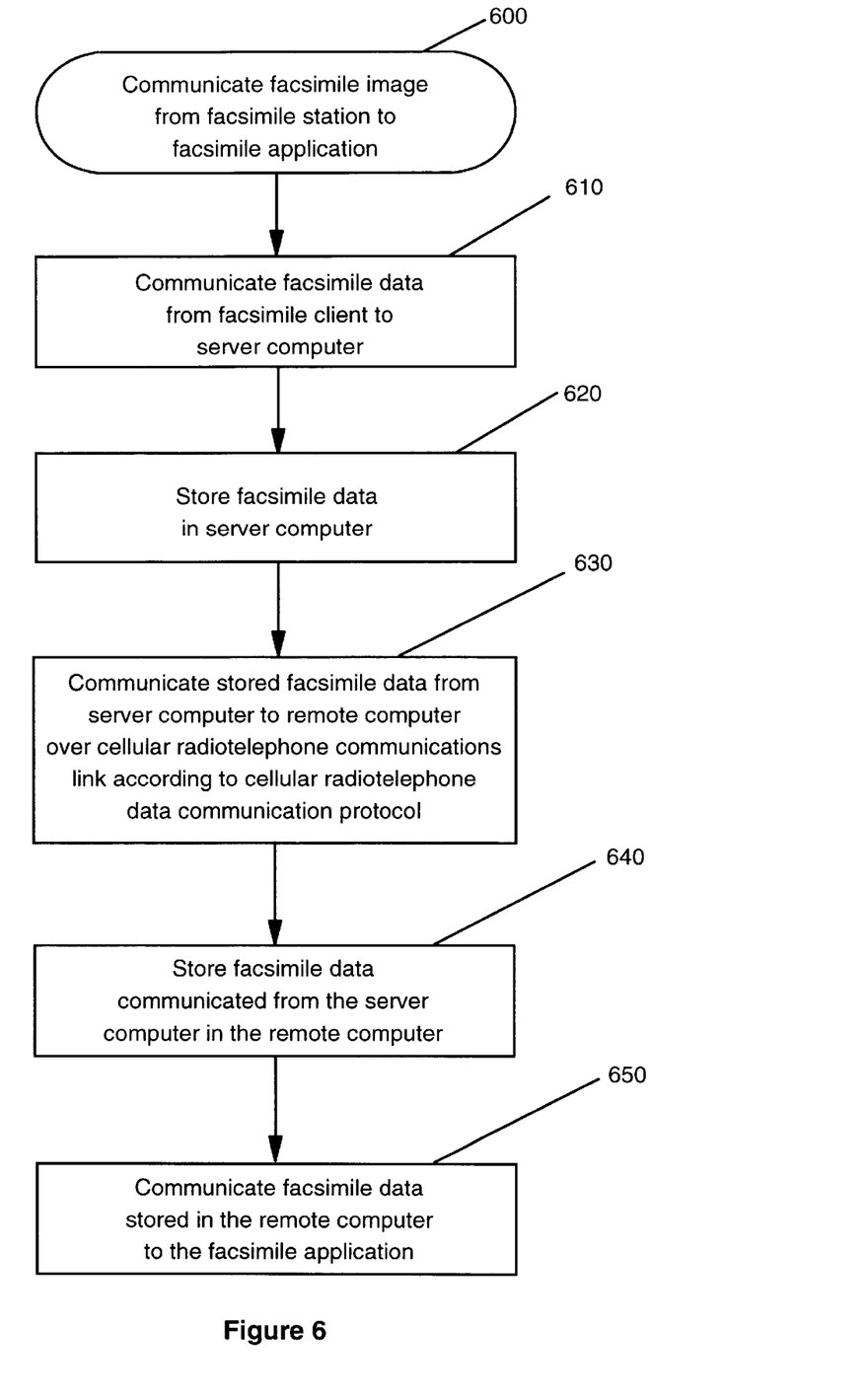
FIG. 6 illustrates operations for communicating a facsimile image from a facsimile station to a facsimile application according to the present invention.

FIG. 6 illustrates operations for communicating a facsimile image from a facsimile station to a facsimile application according to the present invention (Block 600). Facsimile data is communicated from the facsimile station to the server computer (Block 610). The communicated facsimile data is stored in the server computer (Block 620). The stored facsimile data is then communicated from the server computer to the remote computer over the cellular radiotelephone communications link according to a cellular radiotelephone communications protocol (Block 630). The communicated facsimile data is stored in the remote computer (Block 640). The facsimile data stored in the remote computer is then communicated to the facsimile application (Block 650).

Those skilled in the art will understand that a when a first facsimile station issues a "Send Fax" to second station, the second station typically responds with a facsimile identifier which allows the sending station to monitor the status of the facsimile delivery. Such an arrangement may pose problems if the facsimile stations are connected via a cellular radiotelephone communications or other link which is susceptible to dropouts and other temporary communication failures, because the first station may never receive an acknowledgement transmitted from the second station. The facsimile could be received by the second station without the first station being able to determine the status of the send due to never having received the facsimile identifier.

Figure 7:
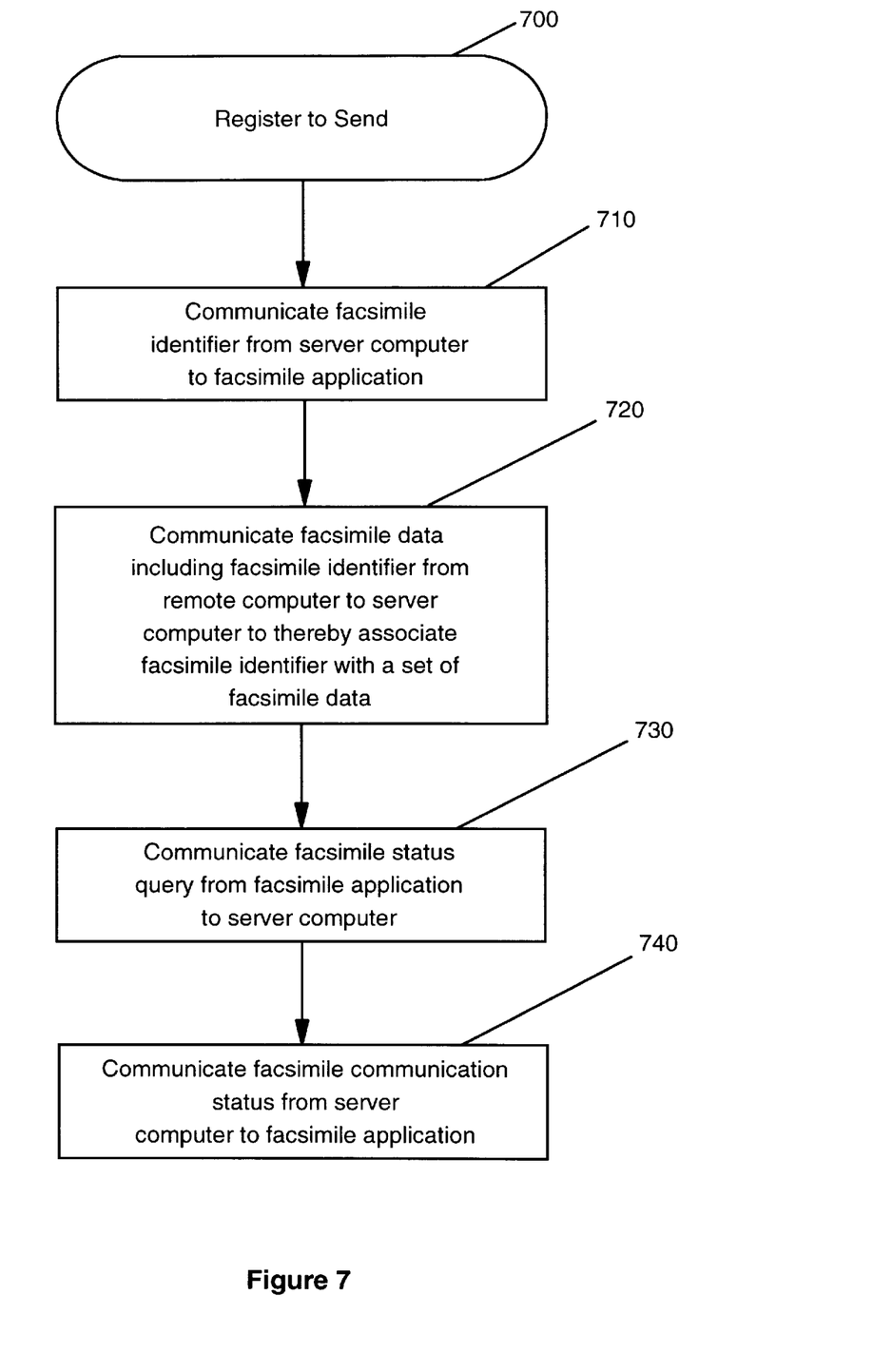
FIG. 7 illustrate operations for a "Register to Send" aspect according to the present invention.

FIG. 7 illustrates operations for a "Register to Send" aspect of the present invention which can avoid this situation (Block 700). A facsimile identifier is communicated from the server computer to the facsimile application (Block 710). Facsimile data including the previously communicated facsimile identifier and a set of facsimile data representing a facsimile image is communicated from the remote computer to the server computer, thereby associating the facsimile identifier with the set of facsimile data (Block 720). A facsimile status query may then be communicated from the facsimile application to the server computer, the facsimile status query including a query as to the status of the set of facsimile data associated with the facsimile identifier (Block 730). A facsimile communication status is communicated from the server computer to the facsimile application, in response to the communicated facsimile status query (Block 740). Those skilled in the art will recognize that the systems and methods described herein may be adapted for communication of facsimile images with a facsimile application resident on a remote computer connected to a client/server system by communications links having characteristic similar to those of a cellular radiotelephone communications link. For example, the systems and methods described herein may be adapted for communicating facsimile images from a facsimile application resident on a remote computer connected to a server computer via an Internet or other distributed network link, using a TCP/IP protocol to communicate facsimile data over the link.

In the drawings and specification, there have been disclosed typical embodiments of the invention and, although specific terms are employed, they are used in a generic and descriptive sense only and not for purposes of limitation, the scope of the invention being set forth in the following claims.

APPENDIX A

Problem

Fax machines transmit images using protocols (e.g., group 3) which are different than generic data protocols (e.g., MNP). Data protocols have been adapted to the cellular environment by adding error correction facilities. Fax protocols have not because of the millions of fax machines currently in use which would not understand new protocols. Without error correction, the transmission of faxes over a cellular link is unreliable; connections typically fail after 1 or 2 pages have been sent.
(P.S. I don't know how to use XEDIT or GML, and I found that the list above containing "all you need to know" didn't in fact contain all I needed to know. So I edited this file with a different editor. Sorry about any formatting UGLINESS. ALSO, I COULDN'T FIGURE OUT HOW TO PRINT THIS DOCUMENT, SO I DIDN'T REVIEW IT FOR ERRORS.)

Solution

By treating fax images as generic data, a fax image can be sent over a cellular link as data to a server. The cellular link can use an error correcting data protocol to improve reliability. The server, operating in a store and forward fashion, accepts the fax image as data, and sends it to a fax machine using a fax protocol.
Details:
Physically, the system in which the fax over cellular solution will operate looks like

APPENDIX A-continued

This system already exists and is used for creating usage logs for data transmitted over cellular links. We are piggybacking the fax solution on top of the existing system for data. This involves additions to the client and the server.
The client establishes a PPP connection with the server. Communication over the transport then involves HTTP requests to:
store fax files on the server
send fax files from the server to a destination fax machine
query the status of faxes
receive faxes stored on the server
other administration functions such as setting user profile parameters (e.g., aging limits, retry counts), deleting faxes
To enable existing fax packages to work with our solution, we are modifying a CAS implementation to issue HTTP requests to our server. (CAS provides a modem independent API that many fax packages interface with.) In addition, we are building a client "mailbox" application which provides coverage of those server functions not accessible from CAS; e.g., the administration functions, and initiating a fax receive from the server to the client.
Other potentially novel ideas:
1. Joint Use of HTTP Content Length and MIME Multipart Boundary to Verify Transmission.
   For sending fax files from the client to the server, we are using MIME multipart messages embedded in the bodies of HTTP requests. (MIME is a heavily used Internet messaging protocol.) Each part of the multipart message contains one fax file. The multipart protocol includes a boundary which identifies the division between one part and the next. HTTP includes a content length specifier which indicates how large the request is. We have included the content length specifier in each part of our multipart message for verification purposes. After reading "content length" bytes for a particular part, we verify that the multipart boundary is the next thing received from the client. Without this mechanism, we would read up to the next boundary for each part. If any of the part were missing, we would not detect it.
2. Pre-allocation of Identifiers for Status Tracking in the Presence of Transmission Errors.
   When the client issues a "send fax" request to the server, the server responds with a fax ID that the client can use for tracking the status of the fax. In the case that the communication link between the client and server was broken after the server received the request, but before the client received the response, the fax would be scheduled for transmission and the client would not know it. We created a "register to send" request in which the server pre-allocates a fax ID for the client to use. The client then sends the fax ID with the "send fax" request, and can track the status of the fax even if communication is broken as described above. HTTP requests are typically independent, having nothing to do with each other. Here, we use the results of one request as input to another.
3. Caching Frequently Used Fax Files to Reduce Transmission Costs.
   Fax files that will be sent to more than one fax machine (e.g., in a group send operation) and/or sent to the same fax machine more than once (e.g., re-using cover pages) can be cached

APPENDIX A-continued on the server. In a "send fax" request, the client can name the fax file(s) to send to a particular destination, instead of sending the file(s) to the server. This reduces the cost of transmission over the cellular link since the client only has to send the fax file(s) to the server once.
Status This idea was presented to the EWC Patent Evaluation Board. The board rated this idea "File" if no invalidating prior art is found and if IBM has clear ownership of the intellectual property associated with this project. It was established later that IBM does have rights to intellectual property for this project.
The board felt that the invention lay in the combination of various elements (CAS protocol, fax server, cellular protocols, HTTP daemons, etc.) in a uniqu way, with some extensions as listed below.
1. The meta-protocol used to register faxes at the server and cause them to be sent, once correct transmission over the cellular link was established.
   The project implemented this as an HTTP daemon. While this is one embodiment of the invention, it is not an essential element.
2. The ability to send the fax once over the cellular link, cache it at the server, and then send instructions to transmit it to multiple fax machines.
   Additionally, the board felt that the invention could be extended in the following ways:
3. Outbound caching of fax images heading toward the cellular-connected device, such that repetitive sends such as fax title pages could be reduced.
4. Converting documents consisting of multiple format components into single fax images.
5. Last-link caching, i.e., extending these ideas to any network configuration where the last link is considerably slower or less reliable that the rest of the network, not just the cellular case.
Evaluation Questions If this problem has been solved before, how was it solved?
As far as I know, it hasn't.
Why is your solution better?
Who outside of IBM (competitors) would want to use your solution?
Cellular service providers.
How could IBM discover that competitors were using your solution?
I'm not sure, but product claims such as "improved reliability of fax over cellular", and "cellular fax server" would be triggers to investigate.

That which is claimed:
1. A method of communicating facsimile images, the method comprising the following steps:
   executing a facsimile application on a remote computer to thereby generate facsimile data destined for at least one facsimile station, the facsimile data representing a facsimile image;
   storing facsimile data produced by the facsimile application in the remote computer;
   communicating stored facsimile data from the remote computer to a server computer over a cellular radiotelephone communications link according to a cellular radiotelephone data communications protocol, wherein the facsimile data is transferred from the facsimile application to the server computer without a facsimile protocol transmission;
   storing facsimile data communicated from the remote computer in the server computer; and
   communicating facsimile data stored in the server computer to the at least one facsimile station.
2. A method according to claim 1 wherein said step of communicating facsimile data stored in the remote computer is preceded by the step of compressing facsimile data produced by the facsimile application to thereby reduce redundant communication of facsimile data over the radiotelephone communications link.
3. A method according to claim 1 wherein said step of communicating facsimile data from the remote computer to the server computer is preceded by the step of communicating a facsimile identifier from the server computer to the facsimile application, wherein said step of communicating stored facsimile data from the remote computer to the server computer comprises the step of communicating facsimile data including the previously communicated facsimile identifier to thereby associate the facsimile identifier with a set of facsimile data communicated from the remote computer to the server computer, said method further comprising the steps of:

communicating a facsimile status query from the facsimile application to the server computer, the facsimile status query comprising a query as to the status of the set of facsimile data associated with the facsimile identifier; and communicating a facsimile communication status from the server computer to the facsimile application, in response to the communicated facsimile status query.

4. A method according to claim 1 wherein the at least one facsimile station comprises at least one of a facsimile application resident on a second remote computer, a facsimile application resident on the server computer and a standard facsimile machine.

5. A method according to claim 1 wherein said step of communicating stored facsimile data from the remote computer to the server computer comprises the step of communicating one of the stored facsimile data or an identifier of the stored facsimile data over the cellular radiotelephone communications link based on whether the stored facsimile data is the same as facsimile data previously communicated between the remote computer and the server computer.

6. A method according to claims:

wherein said step of communicating stored facsimile data from the remote computer to the server computer is preceded by the step of caching facsimile data previously communicated between the facsimile application and the server computer in the remote computer and in the server computer, said step of caching including the step of associating a cache entry identifier with the cached facsimile data;

wherein said step of communicating an identifier of facsimile data comprises the steps of:

identifying a cache entry identifier such that the associated facsimile data cached in the remote computer corresponds to the facsimile data produced by the facsimile application; and communicating the identified data cache entry identifier from the remote computer to the server computer; and wherein said step of storing the communicated facsimile data comprises the step of storing facsimile data cached in the server computer corresponding to the cache entry identifier communicated from the remote computer.

7. A method according to claim 5 wherein said step of communicating facsimile data stored in the remote computer is preceded by the step of compressing facsimile data produced by the facsimile application to thereby reduce redundant communication of facsimile data over the radiotelephone communications link.

8. A method of communicating facsimile images, the method comprising the steps of:

communicating facsimile data representing a facsimile image from a facsimile station to a server computer;

storing facsimile data communicated from the facsimile station in the server computer;

communicating stored facsimile data from the server computer to a remote computer over a cellular radiotelephone communications link according to a cellular radiotelephone data communications protocol;

storing facsimile data communicated from the server computer in the remote computer; and communicating facsimile data stored in the remote computer to a facsimile application resident on the remote computer, the facsimile application operative to receive facsimile data representing a facsimile image, wherein the facsimile data is transferred from the server computer to the facsimile application without a facsimile protocol transmission.

9. A method according to claim 8:

wherein said step of communicating stored facsimile data from the server computer to the remote computer is preceded by the step of caching facsimile data previously communicated between the server computer and the facsimile application in said remote computer and said server computer, along with a cache entry identifier associated therewith;

wherein said step of communicating an identifier of facsimile data comprises the steps of:

identifying a cache entry identifier such that the associated facsimile data cached in the server computer corresponds to facsimile data communicated from the facsimile station; and communicating the identified data cache entry identifier from the server computer to the remote computer; and wherein said step of storing the facsimile data communicated from the server computer comprises the step of storing facsimile data cached in the remote computer corresponding to the cache entry identifier communicated from the server computer.

10. A method according to claim 8:

wherein said step of communicating the facsimile data stored in the server computer is preceded by the step of compressing facsimile data communicated from the facsimile station to thereby prevent redundant communication of facsimile data over the radiotelephone communications link; and wherein said step of communicating facsimile data stored in the remote computer to the facsimile application is preceded by the step of decompressing facsimile data communicated from the server computer.

11. A method according to claim 8 wherein the facsimile station comprises at least one of a facsimile application resident on a second remote computer, a facsimile application resident on the server computer, and a standard facsimile machine.

12. A method according to claim 8 wherein said step of communicating stored facsimile data from the server computer to the remote computer comprises the step of communicating one of the stored facsimile data or an identifier of the stored facsimile data over the cellular radiotelephone communications link based on the determination of whether the stored facsimile data is the same as facsimile data previously communicated between the remote computer and the server computer.

13. A method according to claim 12:

wherein said step of communicating the facsimile data stored in the server computer is preceded by the step of compressing facsimile data communicated from the facsimile station to thereby prevent redundant communication of facsimile data over the radiotelephone communications link; and wherein said step of communicating facsimile data stored in the remote computer to the facsimile application is preceded by the step of decompressing facsimile data communicated from the server computer.

14. A remote computer for communicating facsimile images, the remote computer comprising:

a facsimile application resident on the remote computer, said facsimile application being operative to execute on the remote computer to produce facsimile data representing a facsimile image;

cellular radiotelephone data communicating means for communicating facsimile data between the remote computer and a server computer over a cellular radiotelephone communications link according to a cellular radiotelephone data communications protocol, such that facsimile data is transferred between the facsimile application and the server computer without a facsimile protocol transmission; and client facsimile data storing means, responsive to said facsimile application and to said cellular radiotelephone communicating means, for storing facsimile data on the remote computer.

15. A remote computer according to claim 14 wherein said cellular radiotelephone data communicating means further comprises:

client facsimile data compressing means for compressing facsimile data produced by the facsimile application; and client facsimile decompressing means for decompressing facsimile data communicated from the server computer.

16. A remote computer according to claim 14 comprising means for communicating a facsimile identifier from the server computer to the facsimile application, wherein said cellular radiotelephone communicating means comprises means for communicating facsimile data including the previously communicated facsimile identifier to thereby associate the previously communicated facsimile identifier with a set of facsimile data communicated from the remote computer to the server computer, and further comprising:

means for communicating a facsimile status query from the facsimile application to the server computer, the facsimile status query comprising a query as to the status of the set of facsimile data associated with a facsimile identifier; and means, responsive to said means for communicating a facsimile status query, for communicating a facsimile communication status from the server computer to the facsimile application.

17. A remote computer according to claim 14 wherein said cellular radiotelephone data communicating means comprises means for communicating an identifier of the facsimile data instead of the facsimile data over the cellular radiotelephone communications link if the facsimile data is the same as facsimile data previously communicated between the remote computer and the server computer and for communicating the facsimile data over the cellular radiotelephone communications link if the facsimile data is different from the facsimile data previously communicated between the remote computer and the server computer.

18. A remote computer according to claim 17 wherein said cellular radiotelephone data communicating means further comprises:

client facsimile data compressing means for compressing facsimile data produced by the facsimile application; and client facsimile decompressing means for decompressing facsimile data communicated from the server computer.

19. A remote computer according to claim 14 wherein said means for communicating an identifier of facsimile data comprises remote computer data caching means for caching facsimile data communicated between the remote computer and said server computer in the remote computer, said remote computer data caching means including means for associating a cache entry identifier with cached facsimile data.

20. A remote computer according to claim 19:

wherein said means for communicating an identifier of facsimile data further comprises:

means, responsive to said facsimile application, for identifying a cache entry identifier such that the associated facsimile data cached in the remote computer corresponds to facsimile data produced by the facsimile application; and means, responsive to said means for identifying a cache entry identifier, for communicating the identified cache entry identifier from the remote computer to the server computer over the radiotelephone communications link.

21. A remote computer according to claim 19:

wherein said means for communicating an identifier of facsimile data further comprises:

means for communicating a cache entry identifier from the server computer to the remote computer over the radiotelephone communications link; and means, responsive to said means for communicating the cache entry identifier, for identifying facsimile data cached in the remote computer corresponding to the communicated cache entry identifier; and wherein said client facsimile data storage means comprises means, responsive to said means for identifying facsimile data cached in the server computer, for storing the facsimile data corresponding to the communicated cache entry identifier in the remote computer.

22. A server computer for communicating facsimile images between a facsimile application resident on a remote computer and at least one facsimile station, the facsimile application sending and receiving facsimile data according to a standard facsimile protocol, the server computer comprising:

cellular radiotelephone data communicating means for communicating facsimile data between the remote computer and the server computer over a cellular radiotelephone communications link according to a cellular radiotelephone data communications protocol, wherein said cellular radiotelephone data communicating means comprises means for communicating an identifier of the facsimile data instead of the facsimile data over the cellular radiotelephone communications link if the facsimile data is the same as facsimile data previously communicated between the remote computer and the server computer and for communicating the facsimile data over the cellular radiotelephone link if the facsimile data is different from the facsimile data previously communicated between the remote computer and the server computer;

facsimile data communicating means for communicating facsimile data between the server computer and the at least one facsimile station; and server facsimile data storage means, responsive to said facsimile data communicating means and to said cellular radiotelephone data communicating means, for storing facsimile data on the server computer.

23. A server computer according to claim 22 wherein the at least one facsimile station includes at least one of a facsimile application resident on a second remote computer, a facsimile application resident on the server computer and a standard facsimile machine.

24. A server computer according to claim 22 comprising means for communicating a facsimile identifier from the server computer to the facsimile application, wherein said cellular radiotelephone communicating means comprises means communicating facsimile data including the previously communicated facsimile identifier to thereby associate the previously communicated facsimile identifier with a set of facsimile data communicated from the remote computer to the server computer, and further comprising:

means for communicating a facsimile status query from the remote computer to the server computer, the facsimile status query comprising a query as to the status of the set of facsimile data associated with the facsimile identifier; and     means, responsive to said means for communicating a facsimile status query, for communicating a facsimile communication status from the server computer to the remote computer, in response to a communicated facsimile status query.

25. A server computer according to claim 22 wherein said means for communicating an identifier of facsimile data comprises server computer data caching means for caching facsimile data communicated between the facsimile application and the server computer in the server computer, said server computer data caching means including means for associating a cache entry identifier with the cached facsimile data.

26. A server computer according to claim 25:

wherein said means for communicating an identifier of facsimile data further comprises:

means for communicating a cache entry identifier from the remote computer to the server computer over the radiotelephone communications link; and     means, responsive to said means for communicating the cache entry identifier, for identifying facsimile data cached in the server computer corresponding to the communicated cache entry identifier; and wherein said server facsimile data storage means comprises means, responsive to said means for identifying facsimile data cached in the server computer, for storing the identified cached facsimile data in the server computer.

27. A server computer according to claim 25:

wherein said means for communicating an identifier of facsimile data further comprises:

means, responsive to said server facsimile data storage means, for identifying a cache entry identifier such that the associated facsimile data cached in the server computer corresponds to facsimile data to be communicated to the remote computer; and     means for communicating the identified cache entry identifier from the server computer to the remote computer over the radiotelephone communications link.

* * * * *

UNITED STATES PATENT AND TRADEMARK OFFICE
CERTIFICATE OF CORRECTION

PATENT NO. : 6,055,441
DATED : April 25, 2000
INVENTOR(S) : Bruce R. Wieand et al.

It is certified that error appears in the above-identified patent and that said Letters Patent is hereby corrected as shown below:

Delete the text beginning at Column 12, line 44 through Column 14, line 39 (Appendix A)

Signed and Sealed this

Fifteenth Day of May, 2001

Attest:

NICHOLAS P. GODICI

Attesting Officer      *Acting Director of the United States Patent and Trademark Office*